United States Patent [19]
Ansbjer et al.

[11] Patent Number: 5,638,749
[45] Date of Patent: Jun. 17, 1997

[54] COMPRESSION AND BALING DEVICE

[75] Inventors: Jan Ansbjer; Bo Ansbjer, both of Nossebro, Sweden

[73] Assignee: Bala Industri AB, Nossebro, Sweden

[21] Appl. No.: 569,174

[22] PCT Filed: Jun. 6, 1994

[86] PCT No.: PCT/SE94/00541

§ 371 Date: Dec. 22, 1995

§ 102(e) Date: Dec. 22, 1995

[87] PCT Pub. No.: WO95/00324

PCT Pub. Date: Jan. 5, 1995

[30] Foreign Application Priority Data

Jun. 24, 1993 [SE] Sweden ...................... 9302191

[51] Int. Cl.⁶ .......................................... B30B 5/04
[52] U.S. Cl. ................... 100/87; 53/118; 53/587; 56/341; 100/151
[58] Field of Search ................. 100/87, 88, 151; 56/341; 53/118, 587

[56] References Cited

U.S. PATENT DOCUMENTS

| | | | |
|---|---|---|---|
| 604,012 | 5/1898 | Anderson | 100/87 |
| 688,270 | 12/1901 | Swenson | 100/87 |
| 4,212,149 | 7/1980 | Krone et al. | 100/88 |
| 4,334,467 | 6/1982 | Nishibe et al. | 56/341 |
| 5,129,215 | 7/1992 | Gratton | 53/587 |

FOREIGN PATENT DOCUMENTS

| | | | |
|---|---|---|---|
| 2807058 | 8/1979 | Germany | 56/341 |
| 3630801 | 3/1988 | Germany | 100/88 |
| 3920377 | 1/1991 | Germany | 56/341 |
| 8401893 | 1/1986 | Netherlands | 100/87 |

*Primary Examiner*—Stephen F. Gerrity
*Attorney, Agent, or Firm*—Dvorak and Traub

[57] ABSTRACT

A compressing and baling machine has a compression compartment formed from an endless slat conveyor in the form of an endless mat, which is driven by a pair of rotatable plates interacting with the mat. The endless mat and the frame which it travels upon is deformable into a circular shape, and then sealed by the rotatable plates during compression. The baled product is removed from the compression compartment by the same end plates and is further handled by an output part of the machine which is connected to the plates.

16 Claims, 7 Drawing Sheets

COMPRESSION AND BALING DEVICE

BACKGROUND OF THE INVENTION

1. Field of the Invention

The present invention relates to a device for baling goods, such as for example waste, fiber material and the like, and which includes a drivable pressing part for receiving and compressing the intended goods, and an output part for handling the pressed bale.

2. Description of the Prior Art

Today it is difficult and expensive for municipalities to construct approved waste deposits. Waste transports are expensive. Special dust transports transport small amounts of waste per journey and are driven empty during the return trips. At the conventional storage facilities it is also required that the waste be covered by dirt or clay once a day. The most problematic situation for future generations are the great environmental hazards that result from saturation of dangerous substances in the ground water as well as the toxic gases which are formed during the fermentation process of the waste.

Handling of waste today is an extensive enterprise which includes several different stages and actions, for example, gathering, packeting, packing together, transport, storage, sorting, and recycling. One thing is sure, and that is that the amount of waste grows from year to year and that problems consequently arise when trying to handle this growing amount.

The above problem is solved to a great extent by compressing the wastes and then coating them with plastic, making it airtight. This procedure provides several advantages:

1. Greater flexibility—Instead of waste and other waste products being loaded in comprimator transports, they can be supplied directly to a compressing plant and after compression, fed out as ready pressed bales.

2. Higher efficiency—The compressing plant can be made mobile so that several smaller receiving stations may be utilized, so that the distances of hauling the waste diminishes.

3. Cleaner receiving stations—When the amount of loose waste diminishes the discomforts for people in the neighborhood is reduced due to less odor being emitted when the bale is coated with plastic, this is because the fermentation and the mouldering process of the waste ceases. Furthermore, a compressed round bale of 1200×1200 mm weighs an average 900 kg and occupies less volume.

4. Cheaper transports—Rather than using special cars for relocating the waste up to 10 miles away, now the dust bales may be interstored next to the pressing station. They are then transported with common trucking or railcar transports to either final storage, an incinerator, or a recycling company.

5. Better exploitation of an existing transport system—A vehicle which has not received a full load may be completed with dust bales. Truck-drivers can exploit waiting periods, in which they otherwise would not have time to transport new goods, to thus transport dust bales.

6. The waste depots may store more waste on a smaller area, thereby saving money because construction of a waste depot is very costly and it is difficult to find an approved site.

7. No trickling of poisons into the ground-water—The bales are coated airtight with plastic so no water enters which may release chemicals (as long as the bales do not stand in water).

8. No toxic gases are generated.—Mouldering and fermentation ceases since the waste is no longer exposed to oxygen. However, the bales must be handled in such a way that the plastic is not damaged.

A previously known round bale press for waste and the like includes a laterally open press consisting of rollers placed in a ring shape. A considerable amount of waste falls out from the press at the lateral openings and furthermore, the driving of the rolls is complicated since the rolls are exposed to dirty goods.

SUMMARY OF THE INVENTION

The main object of the present invention is to solve the above problems with simple but yet robust and durable means.

Said object is achieved by means of a device which mainly is characterized by a pressing part that includes an endless mat that is drivable, guided and formable to form a compression chamber, whereby the mat driving part is comprised of rotatable plate end pairs which have driving connections cooperative with the pressing mat.

BRIEF DESCRIPTION OF THE DRAWINGS

The preferred embodiment of the invention is referred to in the following drawings, in which.

DESCRIPTION OF THE PREFERRED EMBODIMENT

Figure 1:
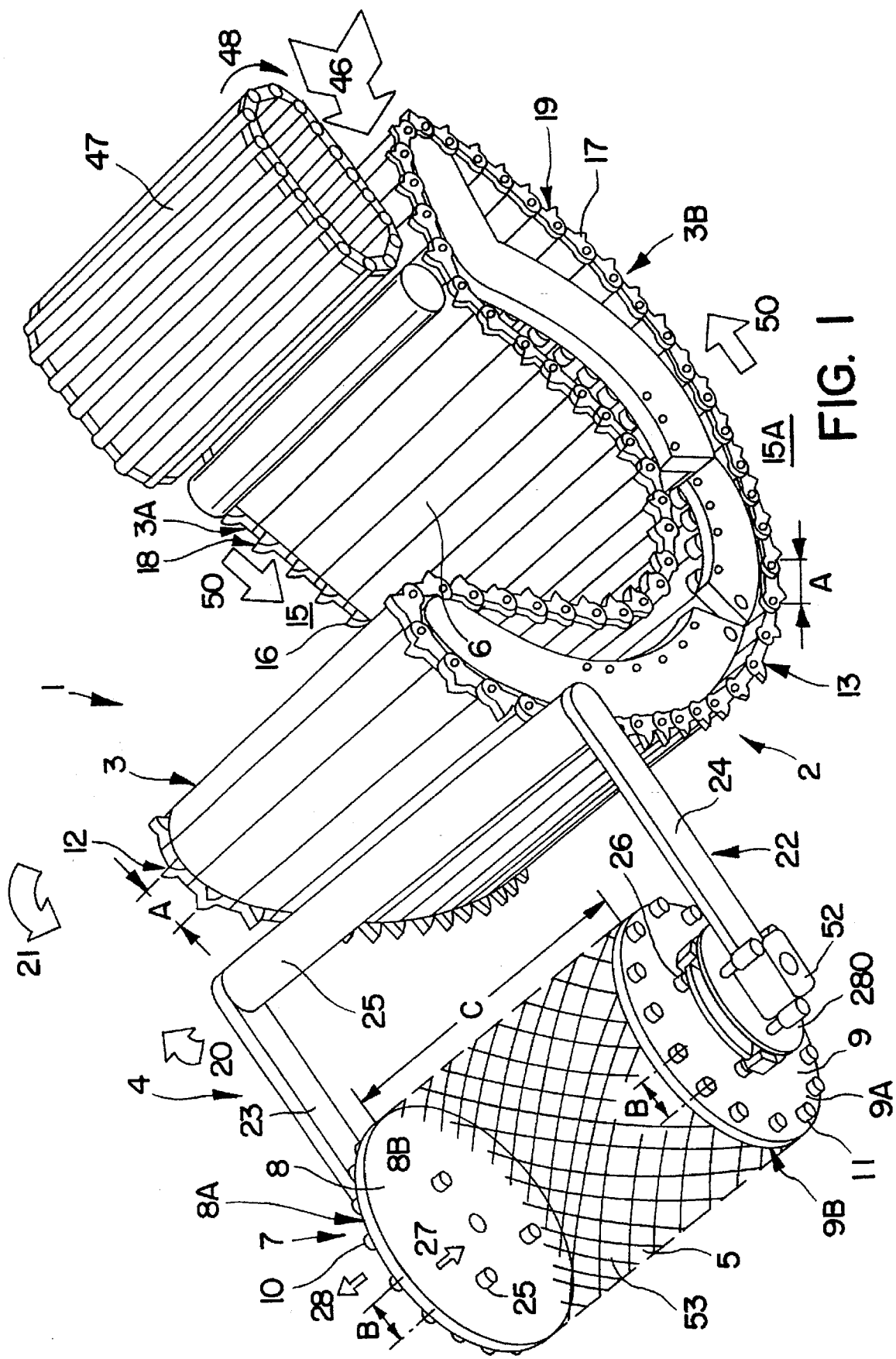
FIG. 1 shows a perspective view of a round baling plant with the press mat shown in an opened position and with the driving end discs in a folded-out position.
Figure 2:
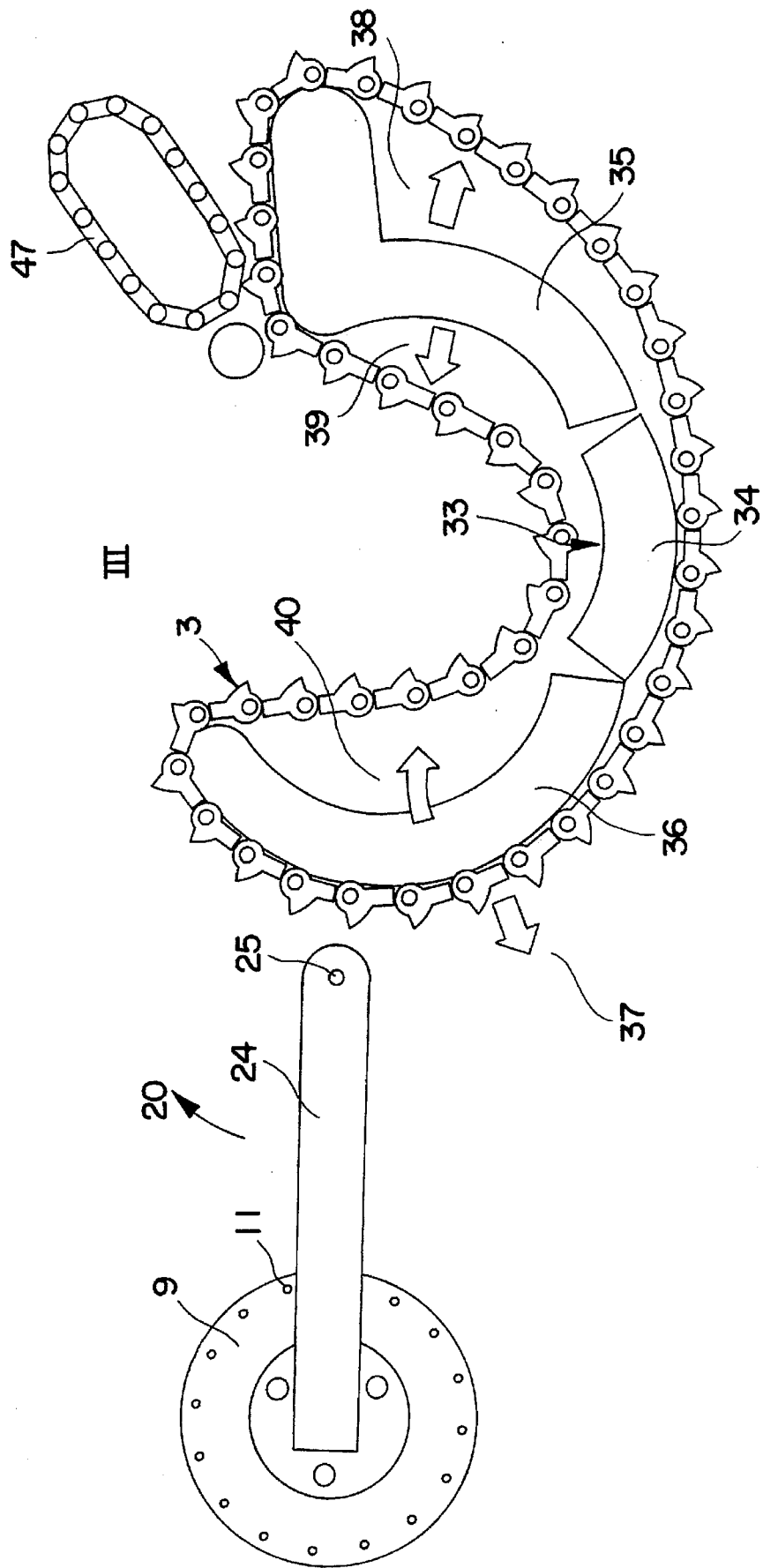
FIG. 2 shows a diagrammatic side view of the plant in said same positions.
Figure 3:
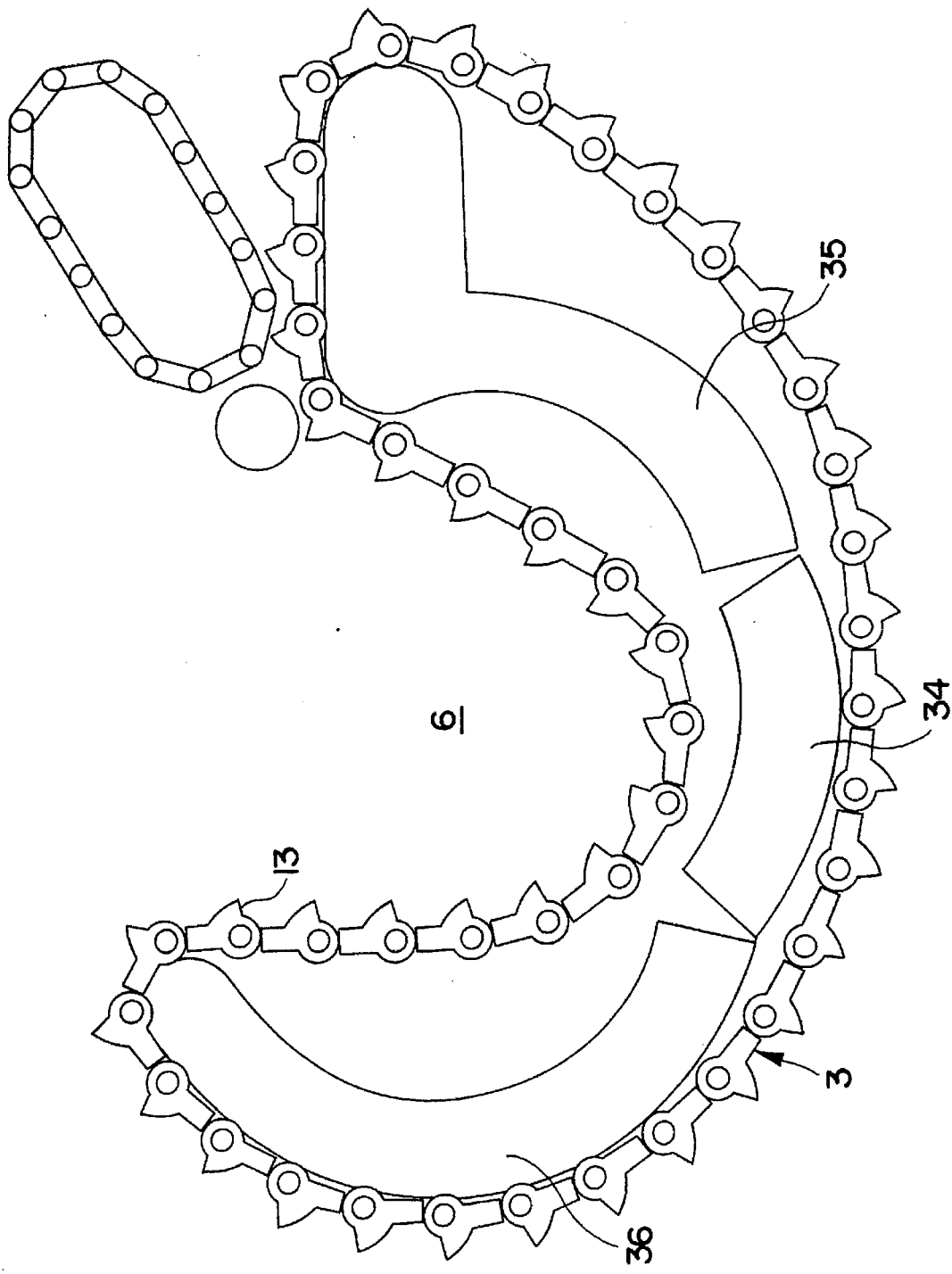
FIG. 3 shows the plant in the bale extraction prepared position.

According to the present invention, presented is a round baling plant 2 for baling waste goods, fibrous material and the like, and it includes a drivable pressing part 3 for receiving and pressing the intended goods, as well as an output part 4 for handling the pressed bale 5, wherein the pressing part 3 is designed as an endless mat or conveyor and which is drivable, guided, as well as formable to constitute a compression chamber 6.

The driving part 7 is comprised of rotatable end discs 8, 9 which includes driving or power transmitting means or connections 10, 11, which are cooperative with the drive meshing means 12, 13 of pressing mat 3. The power transmission means 10, 11 are preferably evenly distributed along at least one of the sides of the end plates 8A, 9A and which are arranged axially projecting from an intended compressing chamber 6 when the end plates 8, 9 are placed in position 1 (FIG. 6) alongside said compressing chamber 6 somewhat forward of the mat 3.

The power transmission means which for instance is formed by several conveyor pins 10, 11 projecting axially from the end plates 8, 9, and are circularly distributed along at least one side 8A, 9A of the end plate which faces outwards of the intended compressing chamber 6. These conveyor pins 10, 11 are in driving engagement with the pressing mat 3, cooperative with driving meshing means 12, 13, which are distributed with corresponding distance A between themselves, which conforms with the operative distance B between the conveyor pins 10, 11, and which are distributed along the length or extension of the mat.

The mat 3 along at least one of its lateral edges 3A, 3B exhibits several bosses 12, 13 at a mutual distance A from each other, distributed along the length extension of the mat.

Figure 7:
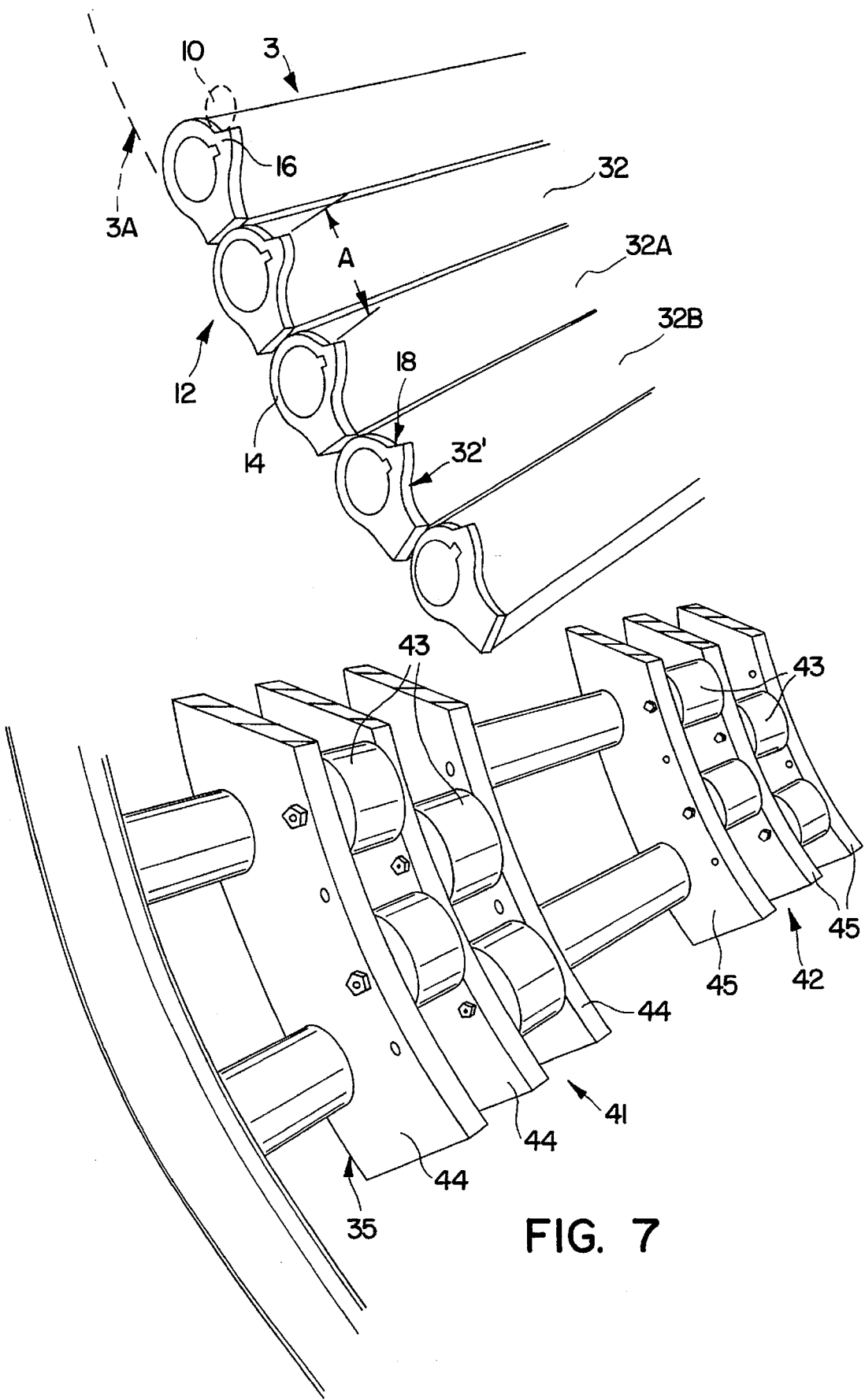
FIG. 7 shows a perspective view of the support and driving means respectively, for a pressing mat.

It appears from for instance in FIG. 7, that a mat end edge 3A is formed from a boss having a part 16, 17 radially projecting from an essentially cylindric body 14, which said body has a pin receiving space 18, 19 which has a complementary shape adapted to receive a conveyor pin 10, 11.

Figure 4:
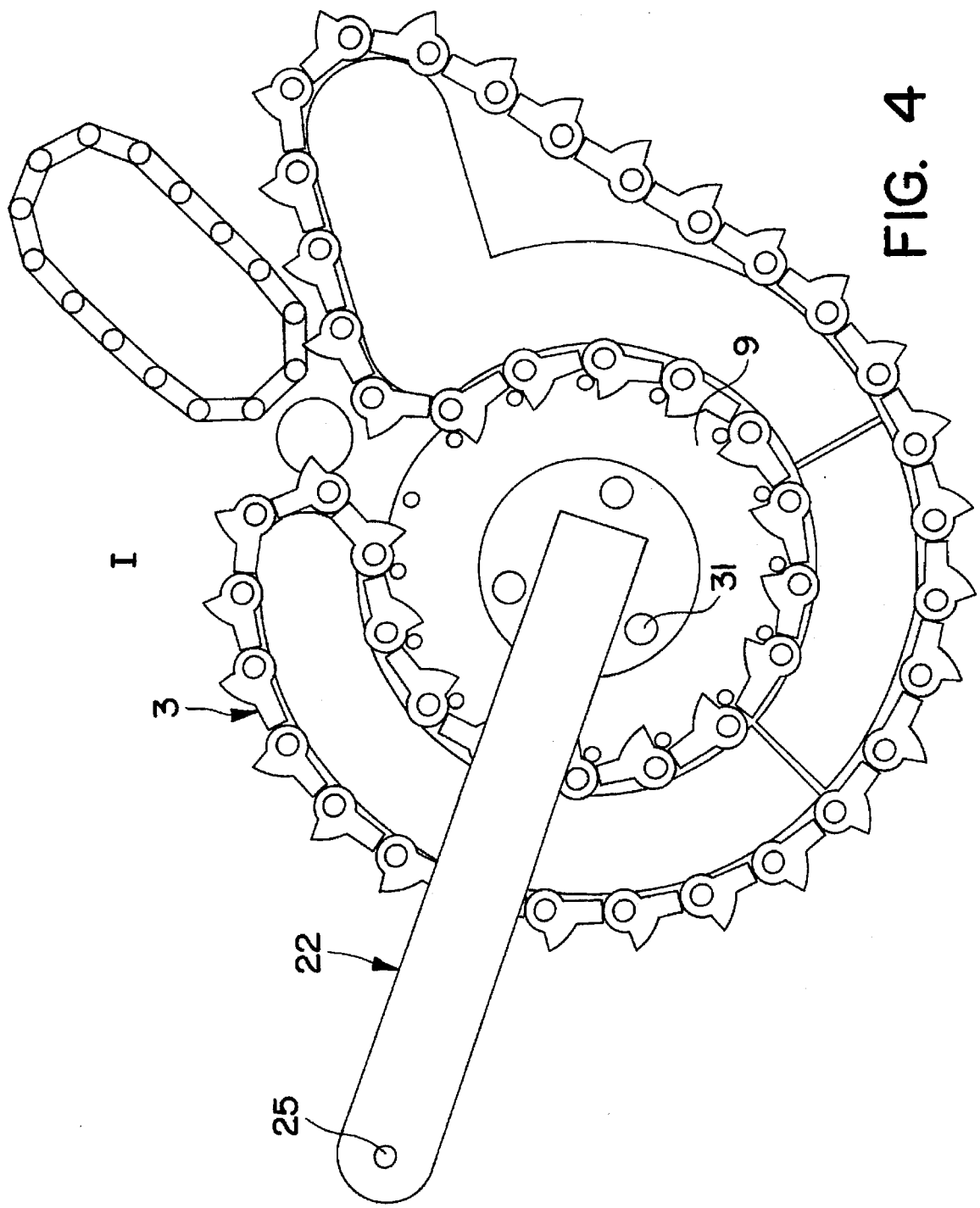
FIG. 4 shows the plant in a bale pressing position.

In addition to the driving and sealing function of the compressing chamber 6, the end plates 8, 9, when kept at a mutual distance C from each other, also function to operate as a bale hoisting device when located at open ends 15, 15A and thereby hold a pressed bale 5 during said lifting phase. For said lifting purposes, the end plates 8, 9 are pivotably supported by arms 23, 24 in an arcuate direction 20 towards and away from the compressing chamber 6. This lift arm assembly 22 consists of two arms 23, 24 connected with each other via a pivot joint 25. The lift arm assembly 22 further may exhibit an adapted length or extension D (FIG. 6) to be able to lead the end plates 8, 9 between a baling position 1, as is shown in FIG. 4, and from there, to a swung out position 11, which is shown in FIG. 1, and which is suitable for delivery of a pressed bale 5 from between the arms 23, 24 and the end plates 8, 9 to a subsequent working station for an automatic airtight wrapping of the bale with a plastic film or a similar airtight cover.

In order to achieve holding a pressed bale 5 between plates 8, 9, the plates may exhibit a number of bale fastening means 25, 26 acting axially. Said bale fastening means can be formed by a number of spears 25, 26 that are movable axially 27 toward the inside of the compression chamber and extending respectively through the end plates 8, 9 to be launched out 27A therefrom influenceably guided from an axially movable actuatable disc 280, which acts between a position where it is inserted on the inside of an end plate 8, 9 respectively, and is conveyable outside the bale pressing part of said end disc, that is, the inside 8B, 9B of the respective end plate 8, 9.

Actuation of the disc 280 may occur via a number of race means 30 in radial grooves 29 located in the middle of the disc received, which race means are connected to the spears 25, 26. Actuation of a driving means 31, for instance hydraulic cylinders, causes axial displacement 27, 27A of the spears 25, 26.

The pressing mat 3 can be formed by several closely connected and pivotably articulated plate shaped slats 32, 32A, 32B, each made of metal or other similar material and which forms the driving engagement means 12, 13 on opposite facing end edges or sides $32^1$ and $32^2$ respectively.

Figure 6:
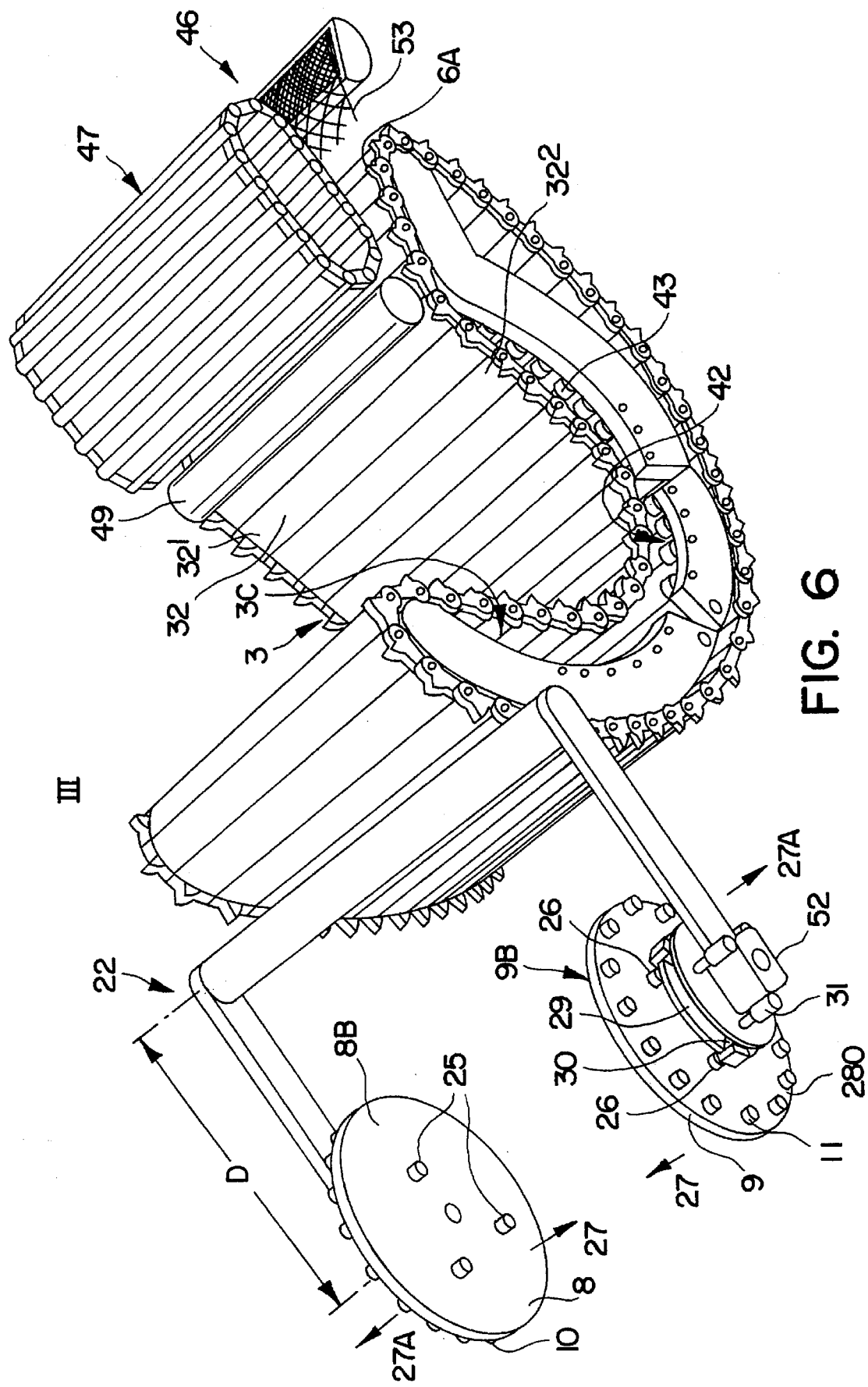
FIG. 6 shows a perspective view of the plant with a net wrapping part.

Further, the pressing mat 3 can be formably guided by a movable guide frame 33, which defines a substantially annular shaped compression chamber 6. The guide frame is divided into three sections 34, 35, 36, each of which can be force actuated by means of hydraulic driven jacks (not shown) causing the sections to be swung between a swung out 37, 38 opened bale retracting position III, as shown in FIG. 6, and a swung inwards 39, 40 closing position I, as shown in FIG. 4. Storage means 41, 42 are present along said guide frame 33, and are cooperative with the underside surface 3C of the press mat which faces away from the compression chamber 6, and are preferably comprised of a series of roller bearings.

The frame sections 34–36 can be pivotably connected to each other laterally and each section has an arcuate shape similar to that of a banana, with rolls 43 being pivotably journalled between the frame bearing supports 44, 45.

Figure 5:
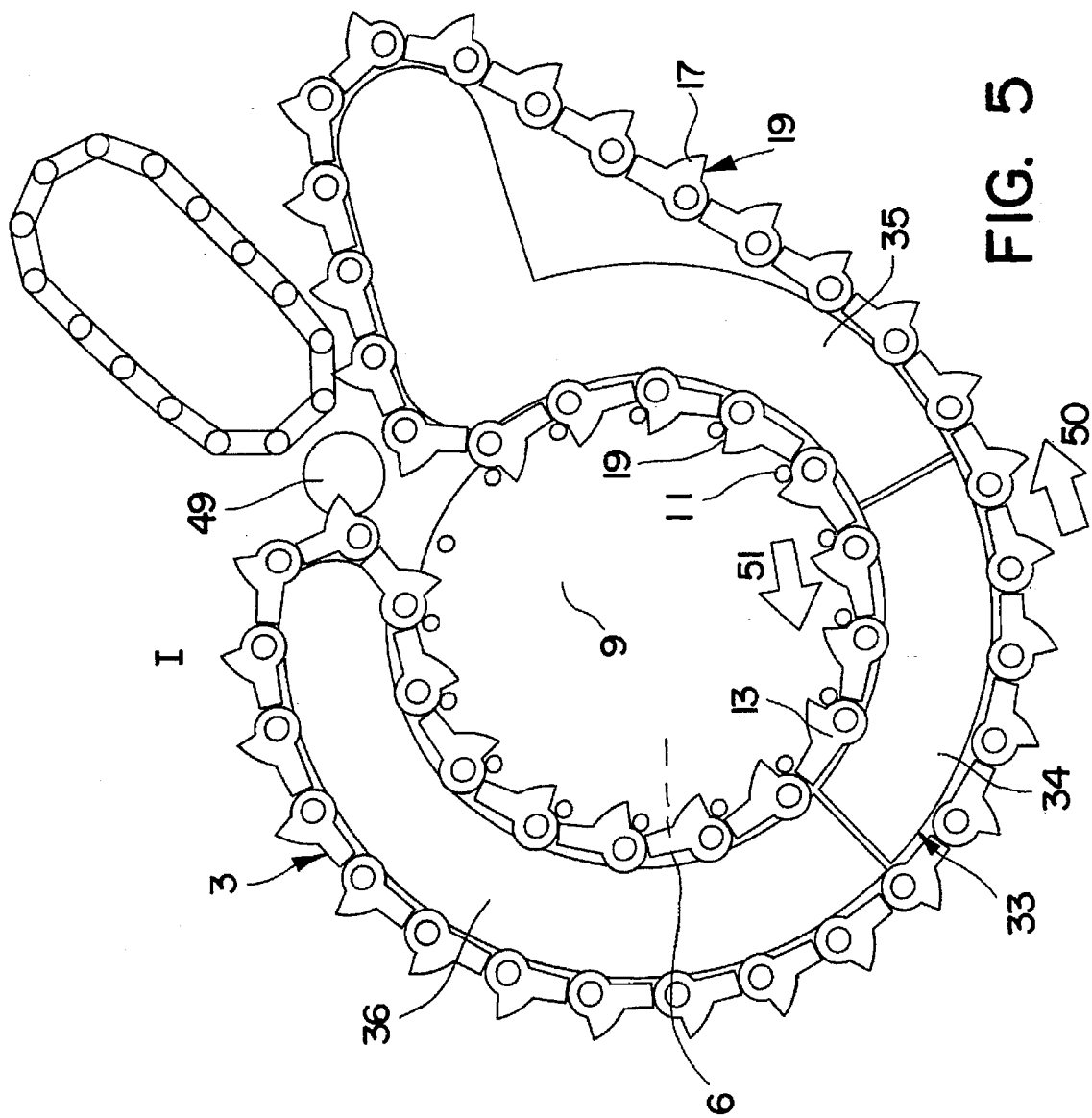
FIG. 5 shows the plant in said bale pressing position without the end discs and bale pivot arms being shown.

The function of the invention should have been obvious from the above described and with the FIG. 6 drawing, but it may be stated that in the intended compressing plant 2, in order to shape round bales 5 of waste and similar goods, the goods are brought via a feeder 46 that is formed between a precompression band 47, which runs in the feeding direction 48, and the outside 6A of the pressing mat 3 before it has reached into the compressing chamber 6 during its operation; a press roller 49 also is present. After a compression, the goods rotate around inside compression chamber 6, which is laterally sealed by the end plates 8, 9, by means of which the pressing mat 3 is driven in the race direction 50 (See FIG. 5). Before rewinding about the frame 33, the race direction 50 of the mat is reversed to the race direction 51 relative to the end plates 8, 9, which are driven by hydraulic motors 52 situated at each of the end plates 8, 9. The goods may rotate until maximal compression pressure has been achieved. A netting or bale yearn 53 is wound round the bale 5 in order to fix it in its compressed form. The bale press 3 is then opened, so that the finished bale 5 can be withdrawn by means of the pivot arms 23, 24. The compression chamber 6 is closed and new goods are then again fed into the plant 2.

Suitable fields of application for the present invention are for households, industrial waste, recyclable paper, recyclable plastic or other recyclable material and also for building waste and other unsorted container waste.

Alternative fields of application can be for compression of industrial manufacturing material, such as cotton, sheep's wool, etc., or for compression baling of forest branches, instead of forming wood chips which give a low volume weight.

The bales of forestry can be stored outdoors in piles in order to dry, whereas in contrast, wood chips which must be dried by energy wasting fans in order not to generate heat and get moldy.

We claim:

1. A compression and baling device for use with compressible products comprising:

a drivable pressing part comprised of an endless mat that is guidable and formable to thereby define a compression chamber, said compression chamber having a first and a second open end, said compression chamber for receiving products to be compressed and baled, said pressing mat delimited by a pair of lateral edges, each of which includes drive meshing means evenly distributed along a length of said mat at said lateral edges;

a driving part for driving said pressing part, said driving part having a pair of laterally spaced, rotatable end plates, each of said end plates including a means for transmitting drive power to said pressing part, said transmission means in driving engagement with said drive meshing means, said transmission means facing outwards of said compression chamber; and an output part for handling a compressed bale of product, said output part pivotably connected to and supporting said end plates.

2. The device according to claim 1, wherein the power transmission means is formed of conveyor pins projecting axially from the end plates and the mat along its lateral edge includes bosses distributed at a mutual distance from each other.

3. The device according to claim 2, wherein the bosses have a part which projects radially from a cylindrically shaped body, which body has a receiving space that is shaped to be adapted to a conveyor pin.

4. The device according to claim 3, wherein the end plates function as a bale hoisting device.

5. The device according to claim 3, wherein said pressing mat is formed of a plurality of pivotable and articulately connected plate shaped slats having opposing ends and made of metal or other similarly hard material and which includes said driving meshing means at said opposite end side edges, respectively.

6. The device according to claim 2, wherein the end plates function as a bale hoisting device.

7. The device according to claim 2, wherein said pressing mat is formed of a plurality of pivotable and articulately connected plate shaped slats having opposing ends and made of metal or other similarly hard material and which includes said driving meshing means at said opposite end side edges, respectively.

8. The device according to claim 1, wherein the end plates function as a bale hoisting device.

9. The device according to claim 8, the end plates are pivotably supported by an arm assembly, which said assembly is adapted to extend in length in order to lead the end plates between a baling position and a swung out position for delivery of a compressed bale for subsequent wrapping with plastic film or similar envelope.

10. The device according to claim 9, wherein the end plates include axially acting bale fastening means inserted on an inside face of each end plate, which said fastening means are comprised of spears extending through the end plates and are actuatably guided by an axially movable actuatable disc via a race means received in a track formed in each of the discs, which said race means are connected with the spears.

11. The device according to claim 9, wherein said pressing mat is formed of a plurality of pivotable and articulately connected plate shaped slats having opposing ends and made of metal or other similarly hard material and which includes said driving meshing means at said opposite end side edges, respectively.

12. The device according to claim 8, the end plates include axially acting bale fastening means inserted on an inside face of each end plate, which said fastening means are comprised of spears extending through the end plates and are guided by an axially movable actuatable disc received in a track formed in each of the discs, which said race means are connected with the spears.

13. The device according to claim 12, wherein said pressing mat is formed of a plurality of pivotable and articulately connected plate shaped slats having opposing ends and made of metal or other similarly hard material and which includes said driving meshing means at said opposite end side edges, respectively.

14. The device according to claim 8, wherein said pressing mat is formed of a plurality of pivotable and articulately connected plate shaped slats having opposing ends and made of metal or other similarly hard material and which includes said driving meshing means at said opposite end side edges, respectively.

15. The device according to claim 1, wherein said pressing mat is formed of a plurality of pivotable and articulately connected plate shaped slats having opposing ends and made of metal or other similarly hard material and which includes said driving meshing means at said opposite side edges, respectively.

16. The device according to claim 1, wherein the pressing mat is formably guided by a movable guide frame into a generally circular compression chamber, said guide frame being divided into several sections and being force actuated to be swung between a swung out bale retracting position and a swung in closed position, wherein bearing means are provided along said guide frame and are cooperative with a surface of the pressing mat, said bearing means being offset from the compression chamber, said means being roller bearings.

* * * * *